(12) United States Patent
Mitsui

(10) Patent No.: US 10,544,291 B2
(45) Date of Patent: Jan. 28, 2020

(54) MASTERBATCH MANUFACTURING METHOD AND TIRE MANUFACTURING METHOD

(71) Applicant: TOYO TIRE CORPORATION, Itami-shi, Hyogo (JP)

(72) Inventor: Akihito Mitsui, Itami (JP)

(73) Assignee: Toyo Tire Corporation, Itami-shi (JP)

( * ) Notice: Subject to any disclaimer, the term of this patent is extended or adjusted under 35 U.S.C. 154(b) by 0 days.

(21) Appl. No.: 16/340,827

(22) PCT Filed: Jul. 10, 2017

(86) PCT No.: PCT/JP2017/025160
§ 371 (c)(1),
(2) Date: Apr. 10, 2019

(87) PCT Pub. No.: WO2018/123113
PCT Pub. Date: Jul. 5, 2018

(65) Prior Publication Data
US 2019/0264009 A1    Aug. 29, 2019

(30) Foreign Application Priority Data

Dec. 27, 2016   (JP) .................................. 2016-252617

(51) Int. Cl.
*C08L 7/02* (2006.01)
*B60C 1/00* (2006.01)
*C08J 3/22* (2006.01)
*C08K 3/04* (2006.01)

(52) U.S. Cl.
CPC .............. *C08L 7/02* (2013.01); *B60C 1/0041* (2013.01); *C08J 3/226* (2013.01); *C08K 3/04* (2013.01); *C08L 2201/52* (2013.01); *C08L 2310/00* (2013.01)

(58) Field of Classification Search
CPC .......... C08L 7/02; B60C 1/0041; C08J 3/226; C08K 3/04
See application file for complete search history.

(56) References Cited

U.S. PATENT DOCUMENTS

2016/0208058 A1    7/2016   Nomura et al.

FOREIGN PATENT DOCUMENTS

| CN | 103819760 B | 12/2015 |
| JP | 2010-229329 A | 10/2010 |
| JP | 2015-44889 A | 3/2015 |
| JP | 2015-54870 A | 3/2015 |
| JP | 2016-89094 A | 5/2016 |

OTHER PUBLICATIONS

Machine translation of JP 2010-229329 (Year: 2010).*
Notificational of Transmittal of Translation of the International Preliminary Report on Patentability (Forms PCT/IB/338) issued in counterpart International Application No. PCT/JP2017/025160 dated Jul. 11, 2019 with Forms PCT/IB/373 and PCT/ISA237. (5 pages).
International Search Report dated Oct. 3, 2017, issued in counterpart International Application No. PCT/JP2017/025160 (1 page).

* cited by examiner

*Primary Examiner* — Edward J Cain
(74) *Attorney, Agent, or Firm* — Westerman, Hattori, Daniels & Adrian, LLP

(57) ABSTRACT

A masterbatch manufacturing method is disclosed in which carbon black is added to a liquid and this is agitated to obtain a carbon black slurry; the carbon black slurry and rubber latex are mixed to obtain pre-coagulation rubber latex; and the pre-coagulation rubber latex is coagulated; wherein, at the operation in which the carbon black slurry is obtained, dispersion time from the start of agitation to the end of agitation is not less than 5 times, but not greater than 40 times. A particle diameter reduction relaxation time v may be found by plotting measurement results on a planar graph in such fashion that elapsed time t (minutes) since the start of agitation is plotted on the horizontal axis, and particle diameter f (μm) of carbon black is plotted on the vertical axis, to obtain a best-fit solution.

9 Claims, 1 Drawing Sheet

MASTERBATCH MANUFACTURING METHOD AND TIRE MANUFACTURING METHOD

TECHNICAL FIELD

The present disclosure relates to a masterbatch manufacturing method and a tire manufacturing method.

BACKGROUND ART

Wet masterbatch might, for example, be manufactured using a procedure in which carbon black is added to water or other such liquid and this is agitated to prepare a carbon black slurry, the carbon black slurry and natural rubber latex are mixed, this is coagulated, the coagulum is dewatered, and plasticization is carried out as this is being dried.

Wet masterbatch manufactured in accordance with such a procedure has superior ability to achieve reduced heat generation in vulcanized rubber as compared with dry masterbatch. A dry masterbatch is a masterbatch produced by causing carbon black to be dry-kneaded into rubber.

PRIOR ART REFERENCES

Patent References

PATENT REFERENCE NO. 1: Japanese Patent Application Publication Kokai No. 2015-44889
PATENT REFERENCE NO. 1: Japanese Patent Application Publication Kokai No. 2015-54870

SUMMARY OF INVENTION

Means for Solving Problem

A masterbatch manufacturing method in accordance with the present disclosure comprises an operation in which carbon black is added to a liquid and this is agitated to obtain a carbon black slurry; an operation in which the carbon black slurry and rubber latex are mixed to obtain pre-coagulation rubber latex; and an operation in which the pre-coagulation rubber latex is coagulated; wherein, at the operation in which the carbon black slurry is obtained, dispersion time from the start of agitation to the end of agitation is not less than 5 times, but not greater than 40 times, a particle diameter reduction relaxation time v. v may be found by plotting measurement results on a planar graph in such fashion that elapsed time t (minutes) since the start of agitation is plotted on the horizontal axis, and particle diameter f (μm) of carbon black is plotted on the vertical axis, to obtain a best-fit solution to Formula I.

Formula I is given by $$f = A\exp\left(-\frac{t}{v}\right) + A_0$$

where, at Formula I, A is a constant, and $A_0$ is a constant.

EMBODIMENTS FOR CARRYING OUT INVENTION

Figure 1:
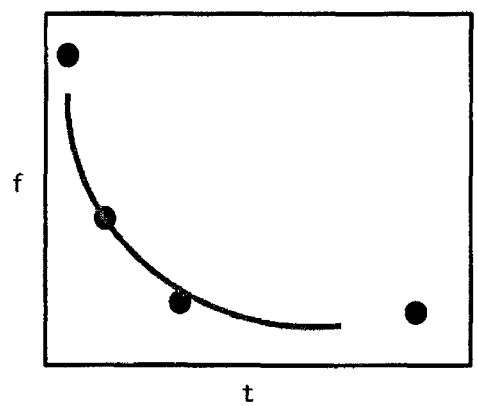
FIG. 1 Drawing for explaining a method for calculating particle diameter reduction relaxation time in accordance with a first embodiment.

It is an object of the present disclosure to provide a method for manufacturing masterbatch having superior ability to achieve improved wear resistance and/or reduced heat generation in vulcanized rubber.

A masterbatch manufacturing method in accordance with the present disclosure comprises an operation in which carbon black is added to a liquid and this is agitated to obtain a carbon black slurry; an operation in which the carbon black slurry and rubber latex are mixed to obtain pre-coagulation rubber latex; and an operation in which the pre-coagulation rubber latex is coagulated; wherein, at the operation in which the carbon black slurry is obtained, dispersion time from the start of agitation to the end of agitation is not less than 5 times, but not greater than 40 times, a particle diameter reduction relaxation time v. v may be found by plotting measurement results on a planar graph in such fashion that elapsed time t (minutes) since the start of agitation is plotted on the horizontal axis, and particle diameter f (μm) of carbon black is plotted on the vertical axis, to obtain a best-fit solution to Formula I.

Formula I is given by $$f = A\exp\left(-\frac{t}{v}\right) + A_0$$

where, at Formula I, A is a constant, and $A_0$ is a constant.

During agitation of the liquid following addition of carbon black, excessive agitation would cause disintegration of the carbon black structure, worsening of dispersion characteristics, and decrease in ability to achieve improved wear resistance and/or reduced heat generation.

In accordance with the method of the present disclosure, because dispersion time is not greater than 40 times v, it is possible to cause disintegration of the carbon black structure to be prevented from occurring beyond a certain degree, to cause dispersion characteristics to be maintained, and to cause decrease in ability to achieve improved wear resistance and/or reduced heat generation to be controlled. Moreover, in accordance with the method of the present disclosure, because dispersion time is not less than 5 times v, it is possible to cause carbon black particle diameter to be made small to a certain degree as a result of agitation, and it is possible to cause fatigue resistance to be maintained.

It is preferred that dibutyl phthalate (DBP) absorption of the carbon black that is added to the liquid be not less than 130 $cm^3$/100 g. Where this is not less than 130 $cm^3$/100 g, there will be increased significance to the fact that the ratio of dispersion time to v is 5 to 40.

A tire manufacturing method in accordance with the present disclosure comprises the masterbatch manufacturing method in accordance with the present disclosure.

Embodiment 1

The present disclosure will now be described in terms of a first embodiment.

A masterbatch manufacturing method in accordance with the first embodiment comprises an operation in which carbon black is added to a liquid and this is agitated to obtain a carbon black slurry. As the liquid, water, rubber latex, and so forth may be cited as examples. Thereamong, rubber latex is preferred. Mixing the rubber latex and the carbon black makes it is possible to prevent reflocculation of carbon black. This is thought to be due to formation of an extremely thin latex phase on all or part of the surface of the carbon black. The rubber latex at the operation in which the carbon black slurry is made might, for example, be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that solids (rubber) concentration in the rubber latex be not less than 0.1 mass %, more preferred that this be not less than 0.2 mass %, and still more preferred that this be not less than 0.3 mass %. The upper limit of the range in values for the solids concentration might, for example, be 5 mass %, it being preferred that this be 2 mass %, and it being more preferred that this be 1 mass %. It is preferred that dibutyl phthalate (DBP) absorption of the carbon black that is added to the liquid be not less than 130 cm$^3$/100 g, and more preferred that this be not less than 140 cm$^3$/100 g. The upper limit of the range in values for DBP absorption might, for example, be 170 cm$^3$/100 g. DBP absorption is measured in accordance with JIS K 6217-4: 2008.

At the operation in which the carbon black slurry is obtained, dispersion time from the start of agitation to the end of agitation is not less than 5 times, but not greater than 40 times, a particle diameter reduction relaxation time v. If the dispersion time is too short, there is a tendency for carbon black particle diameter to not become sufficiently small and for fatigue resistance of the vulcanized rubber to worsen. On the other hand, if the dispersion time is too long, there is a tendency for dispersion characteristics to worsen due to disintegration of the carbon black structure and for there to be decreased ability to achieve improved wear resistance and/or reduced heat generation.

As shown in FIG. 1, v may be found by plotting measurement results on a planar graph in such fashion that elapsed time t (minutes) since the start of agitation is plotted on the horizontal axis, and particle diameter f (μm) of carbon black is plotted on the vertical axis, to obtain a best-fit solution to Formula I. Formula I is indicated below.

$$f = A\exp\left(-\frac{t}{v}\right) + A_0$$

At Formula I, A is a constant, and $A_0$ is a constant. f is the 90 vol % particle diameter, and may be measured by the methods described in the Working Examples.

Figure 2:
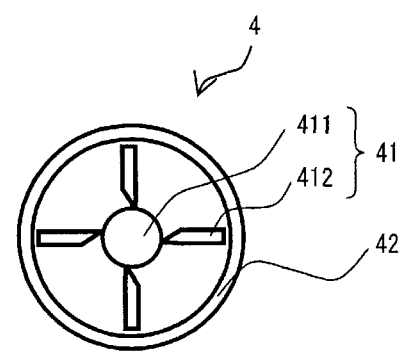
FIG. 2 Schematic front view of the rotor/stator structure at an agitator used at the first embodiment.

Agitation may be carried out using agitator 4 shown in FIG. 2. Agitator 4 is equipped with rotor 41 and stator 42. Rotor 41 is equipped with rotating shaft 411 and blades 412. Stator 42 is provided with a multiplicity of openings (not shown). Agitator 4 is such that rotation of rotor 41 urges the liquid to which carbon black has been added to pass through the clearance between rotor 41 and stator 42. Moreover, agitator 4 is such that rotation of rotor 41 causes the liquid that has been made to pass through the clearance to be guided to and pass through the openings provided in the stator 42. The clearance between blades 412 and stator 42 might, for example, be 0.1 mm to 0.3 mm. Rotor 41 might, for example, rotate at 1000 rpm to 10000 rpm.

At the carbon black slurry which has been obtained in this way, carbon black is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %.

A masterbatch manufacturing method in accordance with the first embodiment further comprises an operation in which the carbon black slurry and rubber latex are mixed to obtain a pre-coagulation rubber latex. The rubber latex for mixture with the carbon black slurry may for example be natural rubber latex, synthetic rubber latex, and/or the like. It is preferred that the solids concentration of the rubber latex for mixture with the carbon black slurry be greater than the solids concentration of the rubber latex at the operation in which the carbon black slurry is made. It is preferred that the solids concentration of the rubber latex for mixture with the carbon black slurry be not less than 10 mass %, and more preferred that this be not less than 20 mass %. The upper limit of the range in values for the solids concentration at the rubber latex might, for example, be 60 mass %, it being preferred that this be 40 mass %, and it being more preferred that this be 30 mass %. The carbon black slurry and the rubber latex may be mixed using a high-shear mixer, high shear mixer, homomixer, ball mill, bead mill, high-pressure homogenizer, ultrasonic homogenizer, colloid mill, and/or other such ordinary disperser. In the pre-coagulation rubber latex, rubber particles, carbon black, and so forth are dispersed in water.

A masterbatch manufacturing method in accordance with the first embodiment further comprises an operation in which the pre-coagulation rubber latex is coagulated to obtain a coagulum. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water.

A masterbatch manufacturing method in accordance with the first embodiment further comprises an operation the coagulum is dewatered, and is plasticized as it is dried.

A masterbatch manufacturing method in accordance with the first embodiment further comprises an operation in which the plasticized coagulum is molded as necessary to obtain masterbatch.

The masterbatch comprises rubber. The rubber might, for example, be natural rubber, isoprene rubber, butadiene rubber, styrene-butadiene rubber, nitrile rubber, chloroprene rubber, and/or the like. It is preferred that the amount of natural rubber in the masterbatch be not less than 70 mass %, more preferred that this be not less than 80 mass %, still more preferred that this be not less than 90 mass %, and still more preferred that this be 100 mass %, per 100 mass % of the rubber.

The masterbatch further comprises carbon black. For every 100 parts by mass of the rubber, it is preferred that the amount of carbon black be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass.

A tire manufacturing method in accordance with the first embodiment further comprises an operation in which masterbatch and compounding ingredient(s)—and, where necessary, rubber not originating from the masterbatch—are dry-blended in a mixer to obtain a mixture. The compounding ingredient(s) might, for example, be stearic acid, wax, zinc oxide, antioxidant, and/or the like. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. As rubber not originating from the masterbatch, natural rubber, isoprene rubber, butadiene rubber, styrene-butadiene rubber, nitrile rubber, chloroprene rubber, and the like may be cited as examples. As the mixer, internal mixers, open roll mills, and the like may be cited as examples. As an internal mixer, Banbury mixers, kneaders, and the like may be cited as examples.

A tire manufacturing method in accordance with the first embodiment further comprises an operation in which a vulcanizing-type compounding ingredient is added to the mixture, and in which the vulcanizing-type compounding ingredient is kneaded into the mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispersing sulfur, and the like may be cited as examples. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises a rubber component. As the rubber component, natural rubber, isoprene rubber, butadiene rubber, styrene-butadiene rubber, nitrile rubber, chloroprene rubber, and the like may be cited as examples. It is preferred that the amount of natural rubber be not less than 40 mass %, and more preferred that this be not less than 50 mass %, per 100 mass % of the rubber component. The upper limit of the range in values for the amount of natural rubber might, for example, be 100 mass %.

The rubber composition further comprises carbon black. For every 100 parts by mass of the rubber component, it is preferred that the amount of carbon black be not less than 10 parts by mass, more preferred that this be not less than 20 parts by mass, and still more preferred that this be not less than 30 parts by mass. For every 100 parts by mass of the rubber component, it is preferred that the amount of carbon black be not greater than 80 parts by mass, and more preferred that this be not greater than 60 parts by mass.

The rubber composition may further comprise stearic acid, wax, zinc oxide, antioxidant, sulfur, vulcanization accelerator, and/or the like. It is preferred that the amount of the sulfur, expressed as equivalent sulfur content, be 0.5 part by mass to 5 parts by mass for every 100 parts by mass of the rubber component. It is preferred that the amount of the vulcanization accelerator be 0.1 part by mass to 5 parts by mass for every 100 parts by mass of the rubber component.

The rubber composition may be employed in tread(s), sidewall(s), chafer(s), bead filler(s), and other such tire member(s). Thereamong, tread is preferred.

A tire manufacturing method in accordance with the first embodiment comprises an operation in which a green tire equipped with a tire member made up of the rubber composition is made. The tire manufacturing method in accordance with the first embodiment further comprises an operation in which the green tire is heated. The tire obtained by the method of the first embodiment may be a pneumatic tire.

WORKING EXAMPLES

Working examples in accordance with the present disclosure are described below.

Raw materials and reagents are indicated below.

| | |
|---|---|
| Natural rubber latex (dry rubber content = 31.2%; Mw = 232,000) | Manufactured by Golden Hope |
| Coagulant | Formic acid (reagent-grade 85%) manufactured by Nacalai Tesque, Inc. (diluted to obtain 10% solution and pH adjusted to 1.2 prior to use) |
| Carbon Black A | "SEAST 3" (DBP absorption 101 $cm^3$/100 g) manufactured by Tokai Carbon Co., Ltd. |
| Carbon Black B | "SEAST KH" (DBP absorption 119 $cm^3$/100 g) manufactured by Tokai Carbon Co., Ltd. |
| Carbon Black C | "N358" (DBP absorption 150 $cm^3$/100 g) |
| Natural rubber | "RSS #3" manufactured in Thailand |
| Zinc oxide | "Zinc Oxide No. 1" manufactured by Mitsui Mining & Smelting Co., Ltd. |
| Stearic acid | "LUNAC S-20" manufactured by Kao Corporation |
| Wax | "OZOACE 0355" manufactured by Nippon Seiro Co., Ltd. |
| Antioxidant A | "NOCRAC 6C" manufactured by Ouchi Shinko Chemical Industrial Co., Ltd. |
| Antioxidant B | "RD" manufactured by Ouchi Shinko Chemical Industrial Co., Ltd. |
| Sulfur | "Powdered Sulfur" manufactured by Tsurumi Chemical Industry Co., Ltd. |
| Vulcanization accelerator | "NOCCELER NS-P" manufactured by Ouchi Shinko Chemical Industrial Co., Ltd. |

Preparation of Masterbatch at Working Examples 1 Through 6 and Comparative Examples 2, 3, 5, 6, 8, and 9

Water was added at 25° C. to natural rubber latex manufactured by Golden Hope to obtain a dilute natural rubber latex having a solids (rubber) concentration that was 0.5 mass %, and a natural rubber latex having a solids (rubber) concentration that was 25 mass %. Carbon black was added to dilute natural rubber latex, and an agitator (Flashblend) manufactured by Silverson was used to carry out agitation at 3600 rpm for the dispersion times indicated at TABLES 1 through 3 to obtain a carbon black slurry. The carbon black slurry was added to the natural rubber latex having the solids (rubber) concentration that was 25 mass % in accordance with TABLES 1 through 3, a mixer (SMV-20 Supermixer) manufactured by Kawata Co., Ltd., was used to carry out agitation, and coagulant was added in an amount sufficient to achieve a pH of 4 to obtain a coagulum. A squeezer-type single-screw dewatering extruder (Model V-02 screw press manufactured by Suehiro EPM Corporation) was used to dewater the coagulum at 160° C., and plasticization was carried out as this was dried, to obtain a masterbatch.

Preparation of Masterbatch at Comparative Examples 1, 4, and 7

Carbon black was added to natural rubber in accordance with TABLES 1 through 3, and a Model B Banbury mixer manufactured by Kobe Steel, Ltd., was used to carry out kneading to obtain a masterbatch.

Preparation of Unvulcanized Rubber at the Respective Examples

The compounding ingredients except for sulfur and vulcanization accelerator were added to the masterbatch in accordance with TABLES 1 through 3, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Calculation of Particle Diameter Reduction Relaxation Time

Carbon black particle diameter was measured every two minutes from the start of agitation until the end of agitation, and the measured values were plotted on a planar graph in such fashion such that elapsed time (minutes) since the start of agitation was plotted on the horizontal axis, and carbon black 90 vol % particle diameter (μm) was plotted on the vertical axis, a best-fit solution to Formula I being obtained to determine the particle diameter reduction relaxation time. Carbon black 90 vol % particle diameter was measured using a "SALD 2200" manufactured by Shimadzu Corporation (CB refractive index: 2.0-0.10i) at an absorbance setting of 0.01 to 0.1.

Loss Tangent tan δ

Unvulcanized rubber was vulcanized at 150° C. for 30 min, and the heat generation of the vulcanized rubber was evaluated based on the tan δ thereof in accordance with JIS K-6394. tan δ was determined based on testing performed using an E4000 rheospectrometer manufactured by UBM at 50 Hz, 80° C., and a dynamic strain of 2%. At TABLE 1, tan δ of the respective Examples are shown as indexed relative to a value of 100 for the tan δ obtained at Comparative Example 1. At TABLE 2, tan δ of the respective Examples are shown as indexed relative to a value of 100 for the tan δ obtained at Comparative Example 4. At TABLE 3, tan δ of the respective Examples are shown as indexed relative to a value of 100 for the tan δ obtained at Comparative Example 7. The lower the index the lower—and thus the better—was the heat generation.

Wear Resistance

Unvulcanized rubber was vulcanized at 150° C. for 30 min, and the amount of wear of the vulcanized rubber was measured using a Lambourn abrasion tester manufactured by Iwamoto Seisakusho with a load of 3 kg and a slip ratio of 20% at a temperature of 23° C. in accordance with JIS K 6264. At TABLE 1, the amount of wear of the respective Examples are shown as indexed relative to a value of 100 for the amount of wear obtained at Comparative Example 1. At TABLE 2, the amount of wear of the respective Examples are shown as indexed relative to a value of 100 for the amount of wear obtained at Comparative Example 4. At TABLE 3, the amount of wear of the respective Examples are shown as indexed relative to a value of 100 for the amount of wear obtained at Comparative Example 7. The lower the index the better it was in terms of wear resistance.

TABLE 1

Using Carbon Black A

| | | | Comparative Examples | | | Working Examples | |
|---|---|---|---|---|---|---|---|
| | | | 1 | 2 | 3 | 1 | 2 |
| Preparation of masterbatch (wet) | Slurry preparation operation | Particle diameter reduction relaxation time min | — | 3.2 | 3.2 | 3.2 | 3.2 |
| | | Dispersion time min | — | 2 | 200 | 24 | 120 |
| | | Dispersion time/Particle diameter reduction relaxation time | — | 0.6 | 63 | 8 | 38 |
| | Parts by mass | Natural rubber latex (solids content) | — | 100 | 100 | 100 | 100 |
| | | Carbon Black A | — | 50 | 50 | 50 | 50 |
| Preparation of masterbatch (dry) | Parts by mass | Natural rubber RSS #3 | 100 | — | — | — | — |
| | | Carbon Black A | 50 | — | — | — | — |
| Preparation of unvulcanized rubber | Parts by mass | Masterbatch | 150 | 150 | 150 | 150 | 150 |
| | | Zinc oxide | 3 | 3 | 3 | 3 | 3 |
| | | Stearic acid | 2 | 2 | 2 | 2 | 2 |
| | | Wax | 1 | 1 | 1 | 1 | 1 |
| | | Antioxidant A | 2 | 2 | 2 | 2 | 2 |
| | | Antioxidant B | 1 | 1 | 1 | 1 | 1 |
| | | Sulfur | 2 | 2 | 2 | 2 | 2 |
| | | Vulcanization accelerator | 1 | 1 | 1 | 1 | 1 |
| Evaluation | | tan δ | 100 | 90 | 96 | 85 | 87 |
| | | Wear resistance | 100 | 100 | 101 | 97 | 96 |

TABLE 2

Using Carbon Black B

| | | | Comparative Examples | | | Working Examples | |
|---|---|---|---|---|---|---|---|
| | | | 4 | 5 | 6 | 3 | 4 |
| Preparation of masterbatch (wet) | Slurry preparation operation | Particle diameter reduction relaxation time min | — | 2.8 | 2.8 | 2.8 | 2.8 |
| | | Dispersion time min | — | 2 | 175 | 21 | 105 |
| | | Dispersion time/Particle diameter reduction relaxation time | — | 0.7 | 63 | 8 | 38 |

TABLE 2-continued

Using Carbon Black B

|  |  |  | Comparative Examples | | | Working Examples | |
| --- | --- | --- | --- | --- | --- | --- | --- |
|  |  |  | 4 | 5 | 6 | 3 | 4 |
|  | Parts by mass | Natural rubber latex (solids content) | — | 100 | 100 | 100 | 100 |
|  |  | Carbon Black B | — | 50 | 50 | 50 | 50 |
| Preparation of masterbatch (dry) | Parts by mass | Natural rubber RSS #3 | 100 | — | — | — | — |
|  |  | Carbon Black B | 50 | — | — | — | — |
| Preparation of unvulcanized rubber | Parts by mass | Masterbatch | 150 | 150 | 150 | 150 | 150 |
|  |  | Zinc oxide | 3 | 3 | 3 | 3 | 3 |
|  |  | Stearic acid | 2 | 2 | 2 | 2 | 2 |
|  |  | Wax | 1 | 1 | 1 | 1 | 1 |
|  |  | Antioxidant A | 2 | 2 | 2 | 2 | 2 |
|  |  | Antioxidant B | 1 | 1 | 1 | 1 | 1 |
|  |  | Sulfur | 2 | 2 | 2 | 2 | 2 |
|  |  | Vulcanization accelerator | 1 | 1 | 1 | 1 | 1 |
| Evaluation |  | tan δ | 100 | 92 | 97 | 83 | 84 |
|  |  | Wear resistance | 100 | 101 | 99 | 96 | 96 |

TABLE 3

Using Carbon Black C

|  |  |  | Comparative Examples | | | Working Examples | |
| --- | --- | --- | --- | --- | --- | --- | --- |
|  |  |  | 7 | 8 | 9 | 5 | 6 |
| Preparation of masterbatch (wet) | Slurry preparation operation | Particle diameter reduction relaxation time min | — | 3.2 | 3.2 | 3.2 | 3.2 |
|  |  | Dispersion time min | — | 2 | 200 | 24 | 120 |
|  |  | Dispersion time/Particle diameter reduction relaxation time | — | 0.6 | 63 | 8 | 38 |
|  | Parts by mass | Natural rubber latex (solids content) | — | 100 | 100 | 100 | 100 |
|  |  | Carbon Black C | — | 50 | 50 | 50 | 50 |
| Preparation of masterbatch (dry) | Parts by mass | Natural rubber RSS #3 | 100 | — | — | — | — |
|  |  | Carbon Black C | 50 | — | — | — | — |
| Preparation of unvulcanized rubber | Parts by mass | Masterbatch | 150 | 150 | 150 | 150 | 150 |
|  |  | Zinc oxide | 3 | 3 | 3 | 3 | 3 |
|  |  | Stearic acid | 2 | 2 | 2 | 2 | 2 |
|  |  | Wax | 1 | 1 | 1 | 1 | 1 |
|  |  | Antioxidant A | 2 | 2 | 2 | 2 | 2 |
|  |  | Antioxidant B | 1 | 1 | 1 | 1 | 1 |
|  |  | Sulfur | 2 | 2 | 2 | 2 | 2 |
|  |  | Vulcanization accelerator | 1 | 1 | 1 | 1 | 1 |
| Evaluation |  | tan δ | 100 | 93 | 98 | 82 | 82 |
|  |  | Wear resistance | 100 | 101 | 101 | 91 | 91 |

By keeping the ratio of dispersion time to particle diameter reduction saturation time within the range 5 to 40, it was possible to reduce the decrease that would otherwise have occurred in ability to achieve improved wear resistance and/or reduced heat generation, making it possible to maintain these capabilities. For example, when the ratio was 0.6, the improvement in tan δ was not more than 10 points, and there was no improvement in wear resistance (see Comparative Examples 1 and 2). And when the ratio was 63, the improvement in tan δ was not more than 4 points, and wear resistance was made worse by 1 point (see Comparative Examples 1 and 3). But when the ratio was 8, tan δ improved by 15 points, and wear resistance improved by 3 points (see Comparative Example 1 and Working Example 1). And when the ratio was 38, tan δ improved by 13 points, and wear resistance improved by 4 points (see Comparative Example 1 and Working Example 2).

The more that the structure was allowed to develop the greater was the reduction in the decrease in capabilities that would otherwise have occurred. For example, with Carbon Black A, tan δ improved by 15 points, and wear resistance improved by 3 points (see Comparative Example 1 and Working Example 1). In contradistinction thereto, with Carbon Black B, tan δ improved by 17 points, and wear resistance improved by 4 points (see Comparative Example 4 and Working Example 3). And with Carbon Black C, tan δ improved by 18 points, and wear resistance improved by 9 points (see Comparative Example 7 and Working Example 5).

Preparation of Masterbatch at Working Examples 7 and 8 and at Comparative Examples 11 and 12

Carbon black was added to water, and an agitator (Flashblend) manufactured by Silverson was used to carry out agitation at 3600 rpm for the dispersion times indicated at TABLE 4 to obtain a carbon black slurry. The carbon black slurry was added to the natural rubber latex having the solids (rubber) concentration that was 25 mass % in accordance with TABLE 4, a mixer (SMV-20 Supermixer) manufactured by Kawata Co., Ltd., was used to carry out agitation, and coagulant was added in an amount sufficient to achieve a pH of 4 to obtain a coagulum. A squeezer-type single-screw dewatering extruder (Model V-02 screw press manufactured by Suehiro EPM Corporation) was used to dewater the coagulum at 160° C., and plasticization was carried out as this was dried, to obtain a masterbatch.

Preparation of Masterbatch at Comparative Example 10

Carbon black was added to natural rubber in accordance with TABLE 4, and a Model B Banbury mixer manufactured by Kobe Steel, Ltd., was used to carry out kneading to obtain a masterbatch.
Preparation of Unvulcanized Rubber at the Various Examples
The compounding ingredients except for sulfur and vulcanization accelerator were added to the masterbatch in accordance with TABLE 4, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.
Loss Tangent tan δ
tan δ of the respective Examples are shown as indexed relative to a value of 100 for the tan δ obtained at Comparative Example 10. The lower the index the lower—and thus the better—was the heat generation.
Wear Resistance
The amount of wear of the respective Examples are shown as indexed relative to a value of 100 for the amount of wear obtained at Comparative Example 10. The lower the index the better it was in terms of wear resistance.

an operation in which the pre-coagulation rubber latex is coagulated;
wherein, at the operation in which the carbon black slurry is obtained, dispersion time from start of agitation to end of agitation is not less than 5 times, but not greater than 40 times, a particle diameter reduction relaxation time v;
wherein v is determined by plotting measurement results on a planar graph in such fashion that elapsed time t (minutes) since start of agitation is plotted on a horizontal axis, and particle diameter f (μm) of the carbon black is plotted on a vertical axis, to obtain a best-fit solution to Formula I;
wherein Formula I is given by $$f = A\exp\left(-\frac{t}{v}\right) + A_0;$$

and
wherein, at Formula I, A is a constant, and $A_0$ is a constant.

2. The masterbatch manufacturing method according to claim 1 wherein dibutyl phthalate (DBP) absorption of the carbon black that is added to the liquid is not less than 130 cm³/100 g.

3. A tire manufacturing method comprising:
an operation in which the masterbatch manufacturing method according to claim 1 is used to prepare a masterbatch;
an operation in which at least the masterbatch and compounding ingredients are dry-mixed to obtain a mixture;
an operation in which at least a vulcanizing-type compounding ingredient is kneaded into the mixture to obtain a rubber composition; and

TABLE 4

Using Carbon Black C Dilute latex not used during slurry preparation

|  |  |  | Comparative Examples | | | Working Examples | |
| --- | --- | --- | --- | --- | --- | --- | --- |
|  |  |  | 10 | 11 | 12 | 7 | 8 |
| Preparation of masterbatch (wet) | Slurry preparation operation | Particle diameter reduction relaxation time min | — | 2.9 | 2.9 | 2.9 | 2.9 |
|  |  | Dispersion time min | — | 2 | 183 | 23 | 110 |
|  |  | Dispersion time/Particle diameter reduction relaxation time | — | 0.7 | 63 | 8 | 38 |
|  | Parts by mass | Natural rubber latex (solids content) | — | 100 | 100 | 100 | 100 |
|  |  | Carbon Black C | — | 50 | 50 | 50 | 50 |
| Preparation of masterbatch (dry) | Parts by mass | Natural rubber RSS #3 | 100 | — | — | — | — |
|  |  | Carbon Black C | 50 | — | — | — | — |
| Preparation of unvulcanized rubber | Parts by mass | Masterbatch | 150 | 150 | 150 | 150 | 150 |
|  |  | Zinc oxide | 3 | 3 | 3 | 3 | 3 |
|  |  | Stearic acid | 2 | 2 | 2 | 2 | 2 |
|  |  | Wax | 1 | 1 | 1 | 1 | 1 |
|  |  | Antioxidant A | 2 | 2 | 2 | 2 | 2 |
|  |  | Antioxidant B | 1 | 1 | 1 | 1 | 1 |
|  |  | Sulfur | 2 | 2 | 2 | 2 | 2 |
|  |  | Vulcanization accelerator | 1 | 1 | 1 | 1 | 1 |
| Evaluation |  | tanδ | 100 | 95 | 99 | 86 | 88 |
|  |  | Wear resistance | 100 | 100 | 101 | 94 | 93 |

The invention claimed is:

1. A masterbatch manufacturing method comprising:
an operation in which carbon black is added to a liquid and this is agitated to obtain a carbon black slurry;
an operation in which the carbon black slurry and rubber latex are mixed to obtain pre-coagulation rubber latex; and an operation in which a green tire equipped with a tire member made up of the rubber composition is made.

4. The masterbatch manufacturing method according to claim 1 wherein dibutyl phthalate (DBP) absorption of the carbon black that is added to the liquid is not greater than 170 cm³/100 g.

5. The masterbatch manufacturing method according to claim 1 wherein the carbon black is present in the carbon black slurry in an amount that is 1 mass % to 15 mass % per 100 mass % of the carbon black slurry.

6. The masterbatch manufacturing method according to claim 1 wherein, at the operation in which the pre-coagulation rubber latex is obtained, the rubber latex that is mixed with the carbon black slurry is natural rubber latex.

7. The masterbatch manufacturing method according to claim 1 wherein the liquid is water.

8. The masterbatch manufacturing method according to claim 1 wherein the liquid is a rubber latex having a solids concentration that is less than that of the rubber latex that is mixed with the carbon black slurry at the operation in which the pre-coagulation rubber latex is obtained.

9. The masterbatch manufacturing method according to claim 1 wherein the liquid is a natural rubber latex having a solids concentration that is less than that of the rubber latex that is mixed with the carbon black slurry at the operation in which the pre-coagulation rubber latex is obtained.

* * * * *